United States Patent Office 2,715,101
Patented Aug. 9, 1955

2,715,101

METHYLENE BLUE AS A POLYMERIZATION INHIBITOR FOR DIACETYLENE

Herbert H. Nelson, Dickinson, Tex., assignor to Monsanto Chemical Company, St. Louis, Mo., a corporation of Delaware No Drawing. Application November 12, 1953, Serial No. 391,755

4 Claims. (Cl. 252—1)

This invention relates to the inhibition of polymerization. In one embodiment, it pertains to the inhibition of undesirable polymer growth in processing equipment. Specifically, it is concerned with a method for the stabilization of diacetylene or of mixtures containing diacetylene against polymerization and the stabilized compositions so produced.

If acetylene is produced from hydrocarbons, e. g., by the well known electric arc process or by thermal decomposition or dissociation, the acetylene-containing gas mixture produced generally contains diacetylene as well, in amounts ranging from as little as 0.05% to as much as 5%. The purification of such an acetylenic gas mixture is usually accomplished by the selective action of suitable solvents. A great number and variety of solvents have been proposed and are effectively employed in well-developed purification processes. However, in these conventional methods of absorption and stripping, the gas mixture is subjected to conditions of temperature and pressure under which some of the diacetylene present polymerizes, and provision must be made in all such processes for periodic removal of the diacetylene polymers to prevent their excessive build-up in the solvent in the absorption step. This requires additional, specialized filtration equipment as well as added process steps which are costly with regard to both time and capital expense. Frequently, too, the diacetylene polymer collects in the less accessible parts of the system, fouling up equipment lines, columns, and the like. Usually, this particular polymer is of such a small particle size that it plugs the filter used for separating it, so that only a small amount can be filtered in each operation and an inordinate length of time is required to wring the filter cake dry.

Methods have been proposed for removal of diacetylene from the gas stream, but these are cumbersome and expensive since they require additional process steps prior to the usual solvent purification operation which utilizes special equipment and significant quantities of special chemicals for treating purposes.

It is an object of the present invention, therefore, to provide a method whereby undesirable polymer growth in the solvent purification of acetylene is inhibited.

It is a further object of the invention to provide a method for stabilization of diacetylene against polymerization.

It is a still further object of the invention to provide novel stabilized compositions comprising diacetylene, a solvent therefor, and an added polymerization inhibitor which do not polymerize when subjected to conditions under which such compositions lacking the inhibitor polymerize readily and rapidly.

Other objects and advantages of the invention will be apparent from the following description and the appended claims.

According to the invention, diacetylene contained in a solvent is stabilized against polymerization by the addition thereto of small quantities of methylene blue. The composition comprising diacetylene, a solvent therefor, and a minor amount of methylene blue will not exhibit any significant polymer formation on prolonged periods of storage or when subjected to temperatures commonly encountered in solvent purification systems for acetylene purification.

The following examples illustrate the invention but are not to be construed as limiting it in any manner.

EXAMPLE I

Diacetylene was generated by dropping 40% sodium hydroxide into a well-stirred solution of 1,4-dichlorobutyne in ethanol at a temperature of approximately 75° C. The product gas was passed through Dry Ice traps and then allowed to bubble through a fritted gas bubbler into technical-grade butyrolactone at room temperature to make a stock solution of 0.3 g. of diacetylene per milliliter of solution. In the polymerization tests, 20 ml. of a test mixture containing a known amount of the diacetylene stock solution, butyrolactone, water, and a weighed amount of the inhibitor were introduced into a thick-walled test tube. The mixture was frozen and the end of the test tube was drawn off in a torch flame to make a sealed ampoule. The sealed ampoules were wrapped in bronze screen and placed in an oven maintained at 125° C. for 16 hours, after which they were removed and inspected for polymer content. Blanks were run in which only butyrolactone-water mixtures and mixtures of butyrolactone, water and diacetylene were present. Results of a series of such tests are presented in Table I.

Table I

| Test No. | Test Mixture | Condition of Test Mixture |
|---|---|---|
| 1 | 50% Butyrolactone–50% $H_2O$. | Usual straw color; perfectly clear; unchanged. |
| 2 | Same as in Test No. 1 above plus 1% methylene blue. | Extremely deep blue color; no solid material present. |
| 3 | 50% BL*–50% $H_2O$ plus 0.25% diacetylene. | Reddish brown suspension of polymer; fairly heavy ppt. of finely divided material. |
| 4 | Same as in Test No. 3 above plus 0.01% methylene blue. | Muddy wine color; slightly hazy; no ppt. settled out. |
| 5 | Same as in Test No. 3 above plus 0.05% methylene blue. | Deep dark green solution; no visible ppt. |
| 6 | Same as in Test No. 3 above plus 0.1% methylene blue. | Dark green solution; no visible ppt. |
| 7 | 50% BL*–50% $H_2O$ plus 0.5% diacetylene. | Heavy brown ppt. settled in bottom of tube; liquid also full of suspended polymer. |
| 8 | Same as in Test No. 7 above plus 0.1% methylene blue. | Very dark amber solution; no visible ppt. |
| 9 | Same as in Test No. 7 above plus 0.5% methylene blue. | Extremely dark amber solution; no visible solids. |
| 10 | Same as in Test No. 7 above plus 1% methylene blue. | Extremely dark greenish black solution; no visible solids. |

*Butyrolactone.

From results of these qualitative tests, it will be seen that inhibition of polymerization of diacetylene is achieved with as little as 0.05% of methylene blue.

EXAMPLE II

The procedure followed in Example I was repeated except that acetonyl acetone was employed in making up the stock solution of diacetylene and was also used as the solvent in the polymerization tests. The corresponding blanks using acetonyl acetone were also run. Results of these tests are presented in Table II.

Table II

| Test No. | Test Mixture | Condition of Test Mixture |
| --- | --- | --- |
| 1 | 50% AA*-50% H₂O | Perfectly clear; medium yellow solution. |
| 2 | Same as in Test No. 1 above plus 0.5% methylene blue. | Extremely dark blue colored solution; no solids. |
| 3 | Same as in Test No. 1 above plus 0.25% diacetylene. | Light brown suspension; some finely-divided brown ppt. |
| 4 | Same as in Test No. 3 above plus 0.01% methylene blue. | Medium-dark green color; very small amount of finely-divided ppt. |
| 5 | Same as in Test No. 3 above plus 0.1% methylene blue. | Very dark blue color; only trace of finely-divided ppt. |
| 6 | Same as in Test No. 3 above plus 0.5% methylene blue. | Extremely dark blue color; no ppt. |

*Acetonyl acetone.

These tests demonstrate that some inhibition of polymerization of diacetylene is achieved with as little as 0.01% of methylene blue while amounts in the range upwards from 0.5% effectively stop polymerization.

While the preceding examples have illustrated specific embodiments of the invention, substantial variations may be made without departing from the scope thereof. For example, the quantity of methylene blue used to inhibit the polymerization of diacetylene can be varied widely, although the amount used depends somewhat on the amount of diacetylene present and the degree of inhibition desired. In general, only minor quantities of the inhibitor are required. Concentrations in the range of about 0.01% to about 5% by weight of the total composition are suitable, with concentrations from about 0.1% to about 1% being preferred. The stabilizing agent may, of course, be employed in as great a concentration as desired.

The inhibitor of the invention is not restricted to use with the solvents set out in the above examples. Methylene blue may be used to inhibit the polymerization of diacetylene in other like organic solvents. In solvent systems where such solvents are used to absorb acetylene from a gas stream containing it in combination with other gases including diacetylene, polymerization of the diacetylene is effectively inhibited by the presence of a minor amount of methylene blue. To inhibit polymer formation during the absorption-stripping operation, the inhibitor can be added directly to the solvent feed stream, or it may be introduced as a solution of the desired concentration at some point in the absorption system. The inhibiting power of the methylene blue is not affected by continual reuse; hence, recirculation of the solvent provides as effective inhibition as the introduction of the fresh solution.

The inhibitor of the invention may also be utilized for preparing stabilized compositions of diacetylene in a solvent which can be safely stored over a period of time without undergoing polymerization with its usual attendant hazards.

The term "consisting essentially of" which appears in the claims hereof is intended to refer to a composition in which the total amounts of the components set forth in the claim constitutes the predominant proportion in the composition. Such term is not intended to exclude the presence of materials such as moisture or water or other material which may be present as an inert diluent and does not adversely affect the solution in any manner. However, the term is intended to exclude the presence of materials which so change the character of the composition that it can no longer be regarded as a solution of diacetylene.

What is claimed is:

1. A composition of matter consisting essentially of diacetylene, a solvent therefor, and methylene blue in an amount from about 0.01% to about 5% by weight of the total composition.

2. A composition of matter consisting essentially of diacetylene, a solvent therefor, and methylene blue in an amount from about 0.1% to about 1% by weight of the total composition.

3. A composition of matter consisting essentially of diacetylene, butyrolactone, and methylene blue in an amount from about 0.01% to about 5% by weight of the total composition.

4. A composition of matter consisting essentially of diacetylene, butyrolactone, and methylene blue in an amount from about 0.1% to about 1% by weight of the total composition.

References Cited in the file of this patent

UNITED STATES PATENTS

| 2,405,693 | Hamill et al. | Aug. 13, 1946 |
| 2,601,673 | McMillan et al. | June 24, 1952 |
| 2,629,708 | Uraneck et al. | Feb. 24, 1953 |
| 2,629,709 | Uraneck et al. | Feb. 24, 1953 |